United States Patent Office 2,872,463
Patented Feb. 3, 1959

2,872,463
REARRANGEMENT OF LARD WITH METAL ALCOHOLATES

Leon A. Van Akkeren, Oak Park, Ill., assignor, by mesne assignments, to Swift & Company, a corporation of Illinois No Drawing. Application January 14, 1954
Serial No. 404,141

25 Claims. (Cl. 260—410.7)

This invention relates to rearrangement of lard with metal alcoholates.

Processes for the modification or rearrangement of lard with metal alcoholates have heretofore been described (Patents 2,571,315 and Re. 23,499), and are currently being used commercially. The metal alcoholates, such as sodium methylate, have been found to be highly efficient catalysts for the rearrangament of lard, but there are some collateral problems associated with the use of metal alcoholate catalysts which have not heretofore been satisfactorily solved.

One problem arising out of the use of metal alcoholates as catalysts for the rearrangement of lard is due to the formation of esters by the combination of lard fatty acid radicals with the alkoxy groups of the catalyst. For example, when sodium methylate is used as a catalyst the methoxy groups of the catalyst will form methyl esters of the higher fatty acids provided by the lard. This problem is made more acute because of the fact that such esters of higher fatty acids weigh much more per mole than the metal alcoholates. By way of illustration, a .5% concentration of sodium methylate at the start of the rearrangement reaction will produce about a 2.5% concentration of the methyl esters of higher fatty acids in the rearranged lard product.

The presence of esters of the type described in the rearranged lard is undesirable, and tends to give the product inferior functional properties. For example, rearranged lard containing several percent of such esters would have a lower smoke point and therefore would be less desirable for use in frying. Another aspect of the problem results from the requirements of the Pure Food and Drug Administration in regard to edible products. Esters containing methoxy groups which may potentially form methyl alcohol are regarded as contaminants. Therefore, it can be seen that the methyl esters of higher fatty acids are especially undesirable for this reason.

The present practice is to remove the undesirable or contaminating esters by deodorization of the rearranged lard, but this results in a considerable loss of product and requires expensive deodorizing equipment. Therefore, this method does not provide a satisfactory solution to the problem.

It is therefore a general object of the present invention to provide a method for substantially overcoming the problems discussed above. More specifically, it is an object of this invention to provide a method of rearranging lard with metal alcoholates while avoiding the difficulties associated with having several percent of undesirable or contaminating esters of higher fatty acids in the rearranged product. A still more specific object is to provide a process in which the loss of higher fatty acids in the lard encountered in present processes involving deodorization of the product is avoided. Still another specific object is to provide a method for producing a rearranged lard which does not require deodorization to remove undesirable or contaminating esters, and with which any necessary odor removal can be carried out by simpler processes, such as alkali refining. A further object is to provide a secondary catalyst composition and also a method for producing such a composition from metal alcoholates, which composition can be used for the rearrangement of lard without producing an ester by-product of the type described. Further objects and advantages will appear as the specification proceeds.

While the exact mechanism by which metal alcoholates act to promote the rearrangement of lard has not been definitely established, there is evidence to indicate that one step in the process involves the reaction of the metal alcoholate catalyst with the lard triglycerides to form a metal glycerate and an ester. For example, this is illustrated by Equation 1 below:

(1) 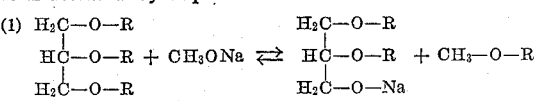

Equation 1 represents the reaction which is believed to occur when lard containing sodium methylate is heated at rearrangement temperatures. The sodium combines with a triglyceride molecule to form a sodium compound which is believed to be sodium glycerate, and the methyl ester of the fatty acid replaced by this sodium is also formed. This is an ester of the type which is undesirable in the rearranged lard and further illustrates the nature of the problem discussed above.

The solution provided to this problem by the present invention is illustrated by Equation 2:

(2) 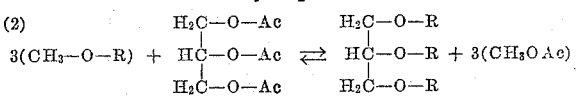

Equation 2 represents a reaction which will occur when triacetin is present in the reaction mixture while it is being heated at lard rearrangement temperatures. As shown in the equation, the acetyl groups of the triacetin can be replaced by the long chain fatty acid groups designated by R of the ester to re-form a triglyceride of the same type as those found in lard together with methyl acetate.

Equation 3 below illustrates another aspect of the present invention:

(3) 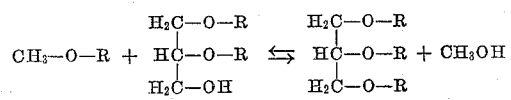

Equation 3 illustrates a reaction which will occur when the reaction mixture contains a glyceride having a free hydroxyl group at lard rearrangement temperatures. The hydrogen of the hydroxyl group is replaced by the long chain fatty acid radical, thereby forming a triglyceride and an alcohol, which in Equation 3 is methyl alcohol.

In its broader scope, the type reaction upon which the present invention is believed to depend can be illustrated as follows:

(4) 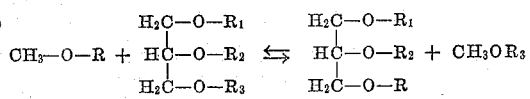

In Equation 4 R represents a long chain fatty acid group derived from lard triglycerides, and $R_1$, $R_2$ and $R_3$ are either hydrogen or fatty acid radicals, at least one of which is hydrogen or a fatty acid radical containing less than 5 carbon atoms. When an ester of the type containing the R group and a glyceride of the type containing the $R_1$, $R_2$ and $R_3$ groups are present in the reaction mixture at lard rearrangement temperatures, a reaction of the type illustrated in Equation 4 will occur. For example, the R group of the ester can replace the $R_3$ group of the glyceride and thereby form compounds of the type illustrated on the right in Equation 4. By way of illustration, if $R_3$ is hydrogen, one of the compounds formed will be methyl alcohol, while if $R_3$ is a fatty acid radical containing less than 5 carbon atoms one of the componds formed will be an ester of lower molecular weight than the higher fatty acid ester illustrated on the left of Equation 4. In either case, the ester or alcohol thus formed will be of considerably higher volatility than the higher fatty acid ester from which it was formed, as illustrated by Equation 4. Therefore, by reducing the pressure sufficiently in relation to the rearrangement temperature, the ester or alcohol formed from the higher fatty acid ester can be evolved as a gas. It is understood that this may be accomplished, for example, by reducing the pressure while holding the temperature constant, or by increasing the temperature while maintaining constant reduced pressure, or by both reducing the pressure and increasing the temperature. The removal of the alcohol or ester as a gas from the reaction mixture will result in the equilibrium illustrated in Equation 4 being shifted to the right, thereby forming more of the volatile ester or alcohol while decreasing the content of the higher fatty acid ester in the reaction mixture. With this explanation then, it is believed that the following discussion of the method of practicing the present invention can be readily understood.

In one of its aspects this invention is concerned with a process for modifying lard wherein a reaction mixture of lard and a metal salt of an alcohol containing less than 5 carbon atoms and less than 3 hydroxyl groups is heated at a rearrangement temperature to produce rearranged lard containing a higher fatty acid ester byproduct. The improvement of the present invention comprises carrying out the heating of the reaction mixture at a reduced pressure and in the presence of a gylceride represented by the type formula:

$$\begin{array}{c} H_2C-O-R_1 \\ HC-O-R_2 \\ H_2C-O-R_3 \end{array}$$

wherein $R_1$, $R_2$ and $R_3$ are selected from the group consisting of hydrogen and fatty acid radicals and at least one of said R's is selected from the group consisting of hydrogen and fatty acid radicals containing less than 5 carbon atoms to form a compound in the reaction mixture of higher volatility than said higher fatty acid ester. Further, the pressure is reduced sufficiently in relation to the temperature to evolve this compound as a gas and shift the equilibrium to decrease the content of the higher fatty acid ester in the modified lard product.

Preferably, the metal alcoholate catalyst is an alkali metal salt of a monohydroxy alkane such as sodium methylate. Other catalysts falling within this preferred class are: sodium ethylate, sodium propylate, and sodium butylate. Other catalysts can be used, such as mono- and di-sodium-ethylene glycolate, and mono- and di-sodium-propylene glycolates, etc.

The preferred class of glycerides falling within the type formula illustrated above can be designated as glycerides containing at least one fatty acid radical with less than 5 carbon atoms. Particularly good results have been obtained with a glyceride such as triacetin providing three such fatty acid radicals. Instead of triacetin, tripropionin and tributyrin can be used. As already indicated, however, glycerides containing at least one glycerol hydroxyl group, that is mono-, di-glycerides, etc. can also be used.

In another of its aspects, this invention employs a reaction of the type described to form a secondary catalyst which is then used for the rearrangement of lard. In fact, this is a preferred method of practicing the present invention since it permits a more efficient utilization of the primary metal alcoholate catalyst, while at the same time making it possible to produce a rearranged lard product which is substantially free of undesirable or contaminating esters. For this purpose it is preferred to employ a greater concentration of the metal alcoholate catalyst than is normally required to catalyze a rearrangement reaction. One purpose of using a higher concentration of the primary catalyst is so that the secondary catalyst produced can be diluted with lard while still being present in a sufficient concentration to catalyze a rearrangement reaction. In other words, it is desired to first form a secondary catalyst containing a high concentration of a metal glycerate such as sodium glycerate while being substantially free of higher fatty acid esters. Since such metal glycerate compounds have been found to be effective catalysts for the rearrangement of lard, it is therefore possible to use this secondary catalyst for rearranging lard without introducing or forming undesirable esters.

For the purpose of preparing a secondary catalyst, a concentration of at least 0.16 mole of the primary metal alcoholate catalyst can be employed per mole of triglyceride in the lard. Preferably, less than 2 moles of the primary catalyst per mole of fat triglyceride should be used, and especially desirable results are obtained using a concentration of 0.48 to 1.6 moles of primary catalyst per mole of fat. Such concentrations will result in the formation of a secondary catalyst containing metal glycerates having approximately the same concentration of metal per mole of fat. For example, if 2 moles of primary catalyst are employed, the fat contained in the resultant secondary catalyst will have about 2 moles of metal per mole of such fat or fat triglyceride. This could also be expressed as 2 moles of metal per mole of the secondary catalyst composition. There is a further important advantage in employing higher concentrations of catalyst than would normally be required to catalyze a rearrangement reaction. This appears to be due to the nature of the equilibrium conditions occurring within the reaction mixture. At the higher catalyst concentration specified the rate of evolution of the volatile alcohol or ester is greatly accelerated, which makes it possible to reduce the undesirable higher fatty acid ester content of the secondary catalyst to less than 1% by weight. This is illustrated by data set out in the examples to follow.

In practice it may not be desirable to produce a secondary catalyst preparation with a higher fatty acid ester content of less than 1% by weight. When suitable lard refining equipment is available it would be possible to accomplish substantial removal of the undesirable byproduct from the rearranged lard product. For example, when continuous deodorization equipment is used in treating rearranged lard, it would only be necessary to remove a portion of the higher fatty acid ester from the secondary catalyst product. After reacting this catalyst with lard to produce a rearranged lard product, further removal of such ester can be readily accomplished using the deodorization equipment. Thus, a rearranged lard product can be prepared which will comply with any specifications, governmental or otherwise, which have been established for such products.

Although the method of this invention is concerned essentially with the rearrangement of lard, it is not necessary to achieve the objects of this invention to employ lard for producing the secondary catalyst. Instead of lard any other edible fat composed of higher fatty acid triglycerides can be used. For example, tallow, cottonseed oil, soybean oil, etc. can be substituted for the lard in preparing the secondary catalyst. However, lard is preferred.

The preferred proportions of the catalyst have been indicated. While the proportion of the glyceride providing the hydroxyl group or short chain fatty acid group is not as critical, it has been found desirable to employ an excess (based on the catalyst used) of the glyceride, or more specifically, an excess of the hydroxyl or short chain fatty acid radicals are preferably present in the reaction mixture. Good results have been obtained with a 50 to 100% excess.

The temperatures employed in practicing the method of this invention are those which have been found operative for the rearrangement of lard to modify its crystal structure, that is, rearrangement temperatures. The temperature should be sufficiently high to maintain in liquid phase all of the glyceride to be rearranged. Also, it will be understood that the temperature should be sufficiently high in relation to the reduced pressure to evolve the low molecular weight alcohol or ester as a gas. Somewhat higher temperatures have been found to favor the alcoholysis reaction as compared with the rearrangement reaction. For example, at preferred pressures and when the glyceride contains free hydroxyl groups, it has been found desirable to use temperatures of from 100 to 150° C., while if the glyceride provides short chain fatty acid groups, the volatile product can be formed satisfactorily at temperatures of from 50 to 80° C. When using temperatures within the preferred range, pressures below 150 to 100 mm. Hg have been found desirable, and excellent results have been obtained at lower pressures around 10 to 20 mm. Hg.

When the embodiment of this invention is employed involving the preparation of a secondary catalyst as described above, an amount of this secondary catalyst is mixed with lard corresponding to the usual catalyst concentration required for a metal alcoholate catalyst, and this mixture is heated at lard rearrangement temperatures to modify the crystal structure of the lard without producing substantially any undesirable ester by-products. It has also been found that somewhat less catalyst is required on the basis of the primary metal alcoholate catalyst than in previous practice when the method of first forming a secondary catalyst is used. Further, rearranged lard products produced with such secondary catalysts have been found to have a finer grain structure than those prepared by the usual method.

This invention is further illustrated by the following specific examples:

*Example I*

150 g. dry lard and 40.6 g. triacetin (0.18 M triacetin or 0.55 M acetyl in 100% excess, based on the sodium methoxide) were mixed and heated to 57° C. To this mixture, 15 g. sodium methoxide (0.27 M), 10% by weight of the oil, was added with rapid stirring. When the catalyst was well dispersed, a "vacuum" was applied to reduce the pressure.

The reaction was continued for 4.5 hours at 11 mm. pressure. During the entire reaction, the temperature varied between 52° C. to 60° C. The methyl acetate was collected over Dry Ice as the reaction progressed.

At the end of the reaction, the methoxyl content was determined in the secondary catalyst by the procedure described in J. of Oil Chem. Soc. 30 (123) 53—R. R. Allen and R. J. Buswell.

In order to be sure that the true methoxyl content was present in the sample, the catalyst was not removed from the tested samples.

EXAMPLE II 81.3 g. of a secondary catalyst composition prepared in the manner described in Example I was mixed with 1426 g. dry lard. This would equal 0.5% active catalyst. The mixture reacted for one half hour with stirring. The catalyst was decomposed with 22 ml. water, and the soap was removed by filtration. A light-colored product was produced.

The sample was found to be rearranged when tested under static conditions and had a low ester content.

EXAMPLE III

A series of experiments were carried out according to the procedure described in Example I.

Throughout this series, the weights of catalyst and triacetin were kept constant, and the proportion of oil was varied. The proportion of catalyst based on the oil was thus varied from 1% to 10%.

The factors that were held constant were as follows:

(1) Catalyst concentration (0.27 M).
(2) Triacetin (0.18 M triacetin or 0.55 M acetyl groups). This is 100% excess of acetyl groups based on the catalyst content.
(3) Pressure (11 mm.).
(4) Temperature (55° C.).

*Table I*

| Sample No. | 1 | 2 | 3 | 4 | 5 | 6 |
|---|---|---|---|---|---|---|
| Catalyst Content | 1% | 2% | 3% | 5% | 7.5% | 10% |
| | Ml. Methyl Acetate Collected at −80° C. | | | | | |
| Time in Minutes: | | | | | | |
| 0 | (¹) | (¹) | (¹) | (¹) | (¹) | (¹) |
| 5 | | | 1.1 | 1.6 | 0.9 | |
| 10 | | | 2.2 | 3.8 | 4.5 | 13.6 |
| 15 | 0.2 | T | 3.7 | 5.6 | 7.6 | 14.4 |
| 20 | | | 4.9 | 7.0 | 9.8 | 14.9 |
| 25 | 0.9 | | 5.8 | 8.2 | 11.8 | 15.2 |
| 30 | | 0.5 | 7.0 | 9.2 | 13.6 | 15.5 |
| 35 | | | 7.7 | 10.0 | 14.8 | 16.2 |
| 40 | | | 8.8 | 11.1 | 16.0 | 16.4 |
| 50 | | | 9.8 | 11.9 | 16.5 | 16.6 |
| 60 | 0.9 | 2.0 | 10.2 | | 16.6 | |
| 65 | | 4.6 | 12.2 | | | |
| 105 | | | | 13.8 | 17.5 | 17.0 |
| 110 | 1.0 | | 13.3 | 14.7 | 18.0 | |
| 150 | | 6.7 | 13.8 | | 18.2 | 17.6 |
| 180 | | 8.0 | 14.6 | 15.9 | | |
| 240 | | | | | 18.6 | 17.9 |
| 245 | 1.4 | 9.0 | 14.9 | 16.2 | 18.6 | 18.0 |

¹ Vacuum started.

*Table II*

| Sample | Catalyst Concentration, Percent | Methyl Acetate Recovered in 4.5 Hours, Grams (Theoretical: 20.4 g.) | Actual Percentage Ester in the Secondary Catalyst | Calculated Percent Ester after Dilution to 0.5% Catalyst Concentration |
|---|---|---|---|---|
| 1 | 1.0 | 1.6 | 5.5 | 2.75 |
| 2 | 2.0 | 9.3 | 4.5 | 1.12 |
| 3 | 3.0 | 15.5 | 1.9 | 0.31 |
| 4 | 5.0 | 17.1 | 4.6 | 0.46 |
| 5 | 7.0 | 19.2 | 1.8 | 0.12 |
| 6 | 10.0 | 18.6 | 0.9 | 0.045 |

Table I shows that the ester content of the reaction mixture can be reduced rapidly when high catalyst concentrations are used. The theoretical yield of methyl acetate is 20.4 g. (22.0 ml. at 25° C.) if the catalyst is pure sodium methoxide.

Table II shows the amounts of the higher fatty acid ester remaining in the secondary catalyst composition, and also the amount of such ester in the final lard product when the secondary catalyst composition is added to natural lard in proportion to produce a product having an equivalent sodium methoxide concentration of 0.5%.

EXAMPLE IV

Another series of experiments were carried out according to the procedure of Example I.

The following conditions were held constant:

(1) Catalyst concentration (0.27 M). This is 2.0% based on the weight of the lard.
(2) Triacetin (0.18 M triacetin or 0.55 M acetyl groups). This is 100% excess of acetyl groups, based on the catalyst content.
(3) Lard (750 grams).
(4) Pressure (11 mm.).

In the first sample, the temperature was held at 55° C., while the second sample was heated to 80° C. The reaction was carried out at this temperature.

*Table III*

| Sample No. | 1 | 2 |
|---|---|---|
| Reaction Temperature | 55° C. | 80° C. |
| | Ml. Methyl Acetate at −80° C. | |
| Time in Minutes: | | |
| 0 | | |
| 5 | (1) | (1) |
| 20 | | 2.6 |
| 35 | 0.5 | 6.1 |
| 65 | 2.0 | 7.5 |
| 105 | 4.6 | 8.5 |
| 180 | 6.7 | 9.4 |
| 270 | 9.0 | 10.6 |

[1] Vacuum started.

*Table IV*

| Sample | Catalyst Concentration, Percent | Methyl Acetate Recovered in 4.5 Hours, Grams (Theoretical: 20.4 g.) | Actual Percentage Ester in the Secondary Catalyst | Calculated Percent Ester after Dilution to 0.5% Catalyst Concentration |
|---|---|---|---|---|
| 1 | 2.0 | 9.3 | 4.5 | 1.12 |
| 2 | 2.0 | 11.3 | 3.8 | 0.95 |

Table III shows that increased temperature increases the speed of ester removal, especially in the early part of the reaction. The theoretical yield of methyl acetate is 20.4 g. (22.0 ml. at 25° C.) if the catalyst used is pure sodium methoxide.

Table IV shows the amounts of the higher fatty acid ester remaining in the secondary catalyst composition, and also the amount of such ester in the final lard product when the secondary catalyst composition is added to natural lard in proportion to produce a product having an equivalent sodium methoxide concentration of 0.5%.

EXAMPLE V

The experiments were carried out according to the procedure of Example I.

The following conditions were held constant:

(1) Catalyst concentration (0.27 M). This is 3% of the weight of the oil.
(2) Triacetin (0.18 M triacetin or 0.55 M acetyl groups). This is 100% excess based on the catalyst concentration.
(3) Lard (500 grams).
(4) Temperature (55° C.).

The pressure was held at 11 mm. for the first experiment. The second experiment was carried out at 20 mm. pressure.

*Table V*

| Sample No. | 1 | 2 |
|---|---|---|
| Pressure | 11 | 20 |
| | Ml. Methyl Acetate at −80° C. | |
| Time in Minutes: | | |
| 0 | | |
| 5 | (1) | (1) |
| 15 | 2.2 | T |
| 30 | 5.8 | 1.8 |
| 60 | 9.8 | 5.0 |
| 105 | 12.2 | 8.7 |
| 150 | 13.3 | 11.1 |
| 180 | 13.8 | 12.0 |
| 240 | 14.6 | 13.4 |
| 270 | 14.9 | 13.8 |

[1] Vacuum started.

*Table VI*

| Sample | Catalyst Concentration, Percent | Methyl Acetate Recovered in 4.5 Hours, Grams (Theoretical: 20.4 g.) | Actual Percentage Ester in the Secondary Catalyst | Calculated Percent Ester after Dilution to 0.5% Catalyst Concentration |
|---|---|---|---|---|
| 1 | 3.0 | 15.5 | 1.9 | 0.31 |
| 2 | 3.0 | 14.5 | 4.1 | 0.68 |

Table V shows that the ester is removed at a faster rate at 11 mm. pressure than at 22 mm. The theoretical yield of methyl acetate is 20.4 g. (22.0 ml. at 25° C.) if the catalyst is pure sodium methoxide.

Table VI shows the amounts of the higher fatty acid ester remaining in the secondary catalyst composition, and also the amount of such ester in the final lard product when the secondary catalyst composition is added to natural lard in proportion to produce a product having an equivalent sodium methoxide concentration of 0.5%.

EXAMPLE VI

The experiments were carried out according to the method of Example I.

The following conditions were held constant during the preparation of the secondary catalyst.

(1) Catalyst concentration (0.27 M). This is 10%, based on the weight of the lard.
(2) Reaction temperature (55° C.).
(3) Concentration of lard (150 g.).
(4) Pressure (11 mm.).

The triacetin content was varied between 12.5% and 100% excess, based on the catalyst concentration.

The two samples in Tables VII and VIII that are marked with an asterisk were blended with additional dry lard until an equivalent of 0.5% sodium methoxide was present. The blend was reacted as described in Example II.

*Table VII*

| Sample No. | 1 | 2 | 3* | 4* |
|---|---|---|---|---|
| Excess Triacetin | 100% | 50% | 50% | 12.5% |
| | Ml. Methyl Acetate Collected at −80° C. | | | |
| Time in Minutes: | | | | |
| 0 | | | | |
| 5 | (1) | (1) | (1) | (1) |
| 15 | 13.6 | 7.6 | 13.5 | 9.2 |
| 20 | 14.4 | 11.3 | 14.5 | 10.6 |
| 25 | 14.9 | 13.2 | 15.0 | 12.6 |
| 30 | 15.2 | 14.6 | 15.2 | |
| 35 | 15.5 | 15.4 | | |
| 40 | 16.2 | 15.8 | 15.7 | |
| 50 | 16.4 | 16.4 | | 12.9 |
| 60 | 16.6 | 16.6 | 16.6 | |
| 110 | 17.0 | | | |
| 135 | | 17.4 | 16.8 | 13.6 |
| 180 | 17.6 | 17.6 | 17.1 | |
| 245 | 17.9 | 17.9 | 17.5 | 13.6 |
| 270 | 18.0 | 17.9 | 17.6 | 13.6 |

[1] Vacuum started.

*Table VIII*

| Sample | Catalyst Concentration, Percent | Methyl Acetate Recovered in 4.5 Hours, Grams (Theoretical: 20.4 g.) | Actual Percentage Ester in the Secondary Catalyst | Calculated Percent Ester after Dilution to 0.5% Catalyst Concentration |
|---|---|---|---|---|
| 1 | 10.0 | 18.6 | 0.9 | 0.045 |
| 2 | 10.0 | 18.5 | | |
| 3 | 10.0 | 18.5 | | *0.087 |
| 4 | 10.0 | 13.9 | | *0.68 |

*Ester content determined on rearranged lard prepared with the secondary catalyst.

The samples marked with an asterisk in Tables VII and VIII were twice as large as the other samples. In order to make the results comparable, half the actual results were recorded.

Table VII shows that under the above experimental conditions, the ester concentration can be reduced at a rapid rate when 50% and 100% excess triacetin, based on the catalyst used, is present. If 12.5% excess triacetin is used, the rate of ester removal is greatly decreased.

Table VIII shows the amounts of the higher fatty acid ester remaining in the secondary catalyst composition, and also the amount of such ester in the final lard product when the secondary catalyst composition is added to natural lard in proportion to produce a product having an equivalent sodium methoxide concentration of 0.5%.

EXAMPLE VII

Two experiments were carried out in which monoglycerides were substituted for triacetin. In this case, the reaction was similar to that with triacetin except that methanol rather than methyl acetate was produced. The reaction was carried out under conditions similar to those described in Example I.

In the first experiment, pure synthetic mono-glycerides (mixture of monolaurin and monomyristin) were used instead of triacetin. Based on the sodium methoxide concentration, 100% excess hydroxyl groups were added to the reaction mixture.

In the second sample, commercial monoglycerides, dried under reduced pressure and recrystallized from Skellysolve "F," were used instead of triacetin. The recrystallized product contained the hydroxyl equivalent of 65% monostearin. Based on the catalyst used, 50% excess hydroxyl groups was added to the reaction mixture.

The following conditions were held constant in both experiments:

(1) Catalyst concentration (0.55 M sodium methoxide).
(2) Pressure (11 mm.).
(3) Temperature (reaction started at 60° C. and raised slowly to above 120° C.).
(4) Lard (300 g.).

The rate at which methyl alcohol was removed from the reaction mixture is shown in Table IX.

*Table IX*

| Excess OH Groups | | 100% | 50% |
|---|---|---|---|
| | Reaction Temperature | Ml. Methyl Alcohol Recovered —80° C. | |
| Time in Minutes: | | | |
| 0 | 55 | 0 | 0. |
| 5 | 68 | | Vacuum Started |
| 47 | 102 | | Alcohol Forming. |
| 47 | 118 | Alcohol Forming. | |
| 60 | 120 | 7.5 | 1.2. |
| 120 | 123 | 16.0 | 8.7. |
| 185 | 120 | 18.3 | 11.0 |
| 270 | 120 | 19.0 | 13.0. |

Table IX shows that the methyl alcohol was reduced faster when 100% excess hydroxyl groups was present than when 50% excess was used. The rate at which the alcohol was removed indicates the rate at which the ester content was reduced in the reaction mixture.

In the above reaction, methyl alcohol was not produced at a measurable rate until the temperature rose above 100° C.

If the sodium methoxide were pure, a theoretical yield of 17.6 g. or 22.2 ml. at 20° C. methyl alcohol would be formed. Actually, 17.3 g. methyl alcohol was formed in the experiment in which 100% excess was employed. The data show that the ester content can be reduced to a low concentration with the aid of hydroxyl groups.

In the foregoing specification reference has been made to higher fatty acids and to triglycerides of such fatty acids. In accordance with the usual classification, the higher fatty acids contain from 8 to 22 carbon atoms.

While in the foregoing specification the method of this invention has been described in detail and specific embodiments thereof have been set forth for purpose of illustration, it will be apparent to those skilled in the art that the method of this invention is susceptible to other embodiments and that many of the details set forth herein can be varied widely without departing from the basic concepts of the invention.

I claim:

1. In a process for modifying lard wherein a reaction mixture of lard and a metal salt of an alcohol containing less than 5 carbon atoms and less than 3 hydroxyl groups is heated at a rearrangement temperature to produce rearranged lard containing a higher fatty acid ester of said alcohol as a by-product, the improvement comprising carrying out said heating of the reaction mixture at a reduced pressure and in the presence of a glyceride represented by the type formula:

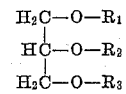

wherein $R_1$, $R_2$, and $R_3$ are selected from the group consisting of hydrogen and fatty acid radicals and at least one of said R's is selected from the group consisting of hydrogen and fatty acid radicals containing less than 5 carbon atoms, said glyceride being present in at least a stoichiometrical equivalent of said alcohol, to form a compound of said alcohol in the reaction mixture of higher volatility than said higher fatty acid ester, said pressure being reduced sufficiently in relation to said rearrangement temperature to evolve said compound as a gas and shift the equilibrium to decrease the content of said ester in the modified lard product.

2. In a process for modifying lard wherein a reaction mixture of lard and an alkali metal salt of a monohydroxy alkane is heated at rearrangement temperature to produce rearranged lard containing a higher fatty acid ester of said alkane as a by-product, the improvement comprising carrying out said heating of the reaction mixture at a reduced pressure and in the presence of a glyceride containing at least one lower fatty acid radical of less than 5 carbon atoms, said glyceride being present in at least a stoichiometrical equivalent of said alkane, to form a lower fatty acid ester of said alkane in the reaction mixture of higher volatility than said higher fatty acid ester, said pressure being reduced sufficiently in relation to said rearrangement temperature to evolve said compound as a gas and shift the equilibrium to decrease the content of said higher fatty acid ester in the modified lard product.

3. The process improvement of claim 2 in which said alkali metal salt of a monohydroxy alkane is sodium methylate.

4. In a process for modifying lard wherein a reaction mixture of lard and sodium methylate is heated at a rearrangement temperature to produce rearranged lard containing as a by-product methyl esters of higher fatty acids, the improvement comprising carrying out said heating of the reaction mixture at a reduced pressure and in the presence of triacetin in at least a stoichiometrical equivalent necessary to form methyl acetate in the reaction mixture, said pressure being sufficiently reduced in relation to said rearrangement temperature to evolve said methyl acetate as a gas and shift the equilibrium to decrease the content of said methyl esters of higher fatty acids in the modified lard product.

5. In a process for modifying lard wherein a reaction mixture of lard and an alkali metal salt of a monohydroxy alkane is heated at a rearrangement temperature to produce rearranged lard containing a higher fatty acid ester of said alkane as a by-product, the improvement comprising carrying out said heating of the reaction mixture at a reduced pressure and in the presence of a glyceride containing at least one free hydroxyl group to form an alcohol in the reaction mixture of higher volatility than said higher fatty acid ester, said glyceride being present in at least a stoichiometrical equivalent of said alkane, but less than 5 percent by weight of the reaction mixture, said pressure being reduced sufficiently in relation to said rearrangement temperature to evolve said alcohol as a gas and shift the equilibrium to decrease the content of said ester in the modified lard product.

6. The process for modifying lard wherein a reaction mixture of lard and sodium methylate is heated at a rearrangement temperature to produce rearranged lard containing a higher fatty acid ester of methyl alcohol as a by-product, the improvement comprising carrying out said heating of the reaction mixture at a reduced pressure and in the presence of a glyceride containing at least one free hydroxyl group to form methyl alcohol in the reaction mixture, said glyceride being present in at least a stoichiometrical equivalent necessary to form said alcohol, but less than 5 percent by weight of the reaction mixture, said pressure being reduced sufficiently in relation to said rearrangement temperature to evolve said alcohol as a gas and shift the equilibrium to decrease the content of said ester in the modified lard product.

7. The process of modifying lard characterized by the steps of forming a reaction mixture containing an edible fat, an alkali metal salt of an alcohol containing less than 5 carbon atoms and less than 3 hydroxyl groups, and a glyceride represented by the type formula:

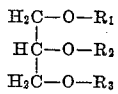

wherein $R_1$, $R_2$, and $R_3$ are selected from the group consisting of hydrogen and fatty acid radicals and at least one of said R's is selected from the group consisting of hydrogen and fatty acid radicals containing less than 5 carbon atoms, said alkali metal salt being present in a greater concentration than normally required to catalyze a rearrangement reaction, said glyceride being present in at least a stoichiometrical equivalent of said alcohol, but less than 5 percent by weight of the reaction mixture, heating said reaction mixture at a rearrangement temperature under reduced pressure to form an alkali metal compound of said fat, a higher fatty acid ester by-product from said alcohol, and a compound of said alcohol of higher volatility than said ester, said pressure being reduced sufficiently in relation to said rearrangement temperature to evolve said compound of higher volatility as a gas and shift the equilibrium to decrease the content of said ester in the reaction mixture, thereafter mixing with lard at least a part of said reaction mixture containing said alkali metal compound of said fat as a catalyst for the rearrangement of said lard, and heating said lard at a rearrangement temperature to produce a modified lard with a reduced content of said higher fatty acid ester.

8. The process of claim 7 in which said edible fat is lard.

9. The process of modifying lard characterized by the steps of forming a reaction mixture containing an edible fat, an alkali metal salt of a monohydroxy alkane containing less than 5 carbon atoms, and a glyceride containing at least one fatty acid radical with less than 5 carbon atoms, said reaction mixture containing from .16 to 2 moles of alkali metal per mole of fat and containing a greater molar concentration of fatty acid radicals with less than 5 carbon atoms than the molar concentration therein of the alkali metal, heating said reaction mixture at a rearrangement temperature under reduced pressure to form an alkali metal compound of said fat, a higher fatty acid ester by-product from said monohydroxy alkane, and a lower fatty acid ester of said alkane, said pressure being reduced sufficiently in relation to said rearrangement temperature to evolve said lower fatty acid ester as a gas and shift the equilibrium to decrease the content of said higher fatty acid ester in the reaction mixture, thereafter mixing with lard at least a part of said reaction mixture containing said alkali metal compound of the fat as a catalyst for the rearrangement of said lard, and heating the lard mixture at a rearrangement temperature to produce a modified lard with a reduced content of said higher fatty acid ester.

10. The process of claim 9 in which said alkali metal salt is sodium methylate.

11. The process of claim 10 in which said edible fat is lard.

12. The process of modifying lard characterized by the steps of forming a reaction mixture containing an edible fat, sodium methylate, and triacetin, from .48 to 1.6 moles of sodium methylate being present per mole of said fat and the concentration of triacetin being sufficient to provide a greater molar concentration of acetyl radicals than said molar concentration of sodium methylate, heating said reaction mixture at a rearrangement temperature under reduced pressure to form sodium glycerate, higher fatty acid methyl esters, and methyl acetate, said pressure being sufficiently reduced in relation to said rearrangement temperature to evolve said methyl acetate as a gas and shift the equilibrium to decrease the content of said higher fatty acid methyl esters in the reaction mixture, thereafter mixing with lard at least a part of said reaction mixture containing said sodium glycerate as a catalyst for the rearrangement of said lard, and heating said lard mixture at a rearrangement temperature to produce a modified lard with a reduced content of said higher fatty acid methyl esters.

13. The process of modifying lard characterized by the steps of forming a reaction mixture containing an edible fat, an alkali metal salt of an alcohol containing less than 5 carbon atoms and less than 3 hydroxyl groups, and a glyceride containing at least one free hydroxyl group, said alkali metal salt being present in a greater concentration than normally required to catalyze a rearrangement reaction, said glyceride being present in at least a stoichiometrical equivalent of said alcohol, heating said reaction mixture at a rearrangement temperature under reduced pressure to form an alkali metal compound of said fat, a higher fatty acid ester by-product from said alcohol, and said alcohol of higher volatility than said by-product, said pressure being reduced sufficiently in relation to said rearrangement temperature to evolve said alcohol as a gas and shift the equilibrium to decrease the content of said by-product in the reaction mixture, thereafter mixing with lard to be modified at least a part of said reaction mixture containing said alkali metal compound of said fat as a catalyst for the rearrangement of the lard, and heating the lard mixture at a rearrangement temperature to produce a modified lard with a reduced content of said by-product.

14. The process of claim 13 in which said alkali metal salt is sodium methylate and in which said alcohol of higher volatility is methyl alcohol.

15. The method of producing a rearrangement catalyst, comprising forming a reaction mixture containing an edible fat, an alkali metal salt of a monohydroxy alkane containing less than 5 carbon atoms, and a glyceride containing at least one fatty acid radical with less than 5 carbon atoms, said salt providing an alkali metal concentration of from 0.48 to 1.6 moles of the alkali metal per mole of said fat and said glyceride providing a greater concentration of fatty acid radicals of less than 5 carbon atoms than the concentration of said alkali metal, heating said reaction mixture at a rearrangement temperature under reduced pressure to form an alkali metal compound of said fat, a higher fatty acid ester by-product from said alkane, and a lower fatty acid ester of said alkane of higher volatility than said by-product, said pressure being reduced sufficiently in relation to said rearrangement temperature to evolve said lower fatty acid ester as a gas and shift the equilibrium to decrease the content of said by-product in the reaction mixture, the heating at said reduced pressure being continued until the content of said by-product is decreased to less than 10% by weight of said reaction mixture to produce a rearrangement catalyst.

16. The method of producing a rearrangement catalyst, comprising forming a reaction mixture containing lard, sodium methylate, and triacetin, from .48 to 1.6 moles of sodium methylate being present per mole of lard and said triacetin providing a greater molar concentration of acetyl groups than the concentration of sodium methylate, heating said reaction mixture at a rearrangement temperature under reduced pressure to form sodium glycerate, a by-product of higher fatty acid methyl esters, and methyl acetate, said pressure being reduced sufficiently in relation to said rearrangement temperature to evolve said methyl acetate as a gas and shift the equilibrium to decrease the content of said by-product in the reaction mixture, the heating at said reduced pressure being continued until the content of said by-product is decreased to less than 10% by weight of said reaction mixture to produce a rearrangement catalyst.

17. A fatty rearrangement catalyst composition comprising essentially a metal glycerate and a glyceride represented by the type formula:

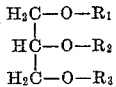

wherein $R_1$, $R_2$, and $R_3$ are selected from the group consisting of hydrogen and fatty acid radicals and at least one of said R's is selected from the group consisting of hydrogen and fatty acid radicals containing less than 5 carbon atoms, said glyceride being present in less than five percent by weight of the composition, said composition being substantially free from lower alkoxy radicals.

18. A fatty rearrangement catalyst substantially as described in claim 17 wherein the glyceride is triacetin.

19. A fatty rearrangement catalyst composition substantially as described in claim 17 wherein the metal is in the ratio of about 0.16 to 2 moles per mole of fat in said composition.

20. The fatty rearrangement catalyst composition of claim 17 in which said metal glycerate is an alkali metal glycerate.

21. The fatty rearrangement catalyst composition of claim 17 in which said glyceride has a radical which is a lower fatty acid group containing less than 5 carbon atoms.

22. A fatty rearrangement catalyst composition substantially as described in claim 17 wherein the metal is in the ratio of about 0.48 to 1.6 moles per mole of fat in said composition.

23. The fatty rearrangement catalyst composition of claim 17 in which said glycerate is a glycerate of lard.

24. The fatty rearrangement catalyst composition of claim 17 in which said metal is sodium.

25. The fatty rearrangement catalyst composition of claim 17 in which said glyceride contains an acetyl radical.

References Cited in the file of this patent

UNITED STATES PATENTS

| | | |
|---|---|---|
| 1,744,596 | Van Loon | Jan. 21, 1930 |
| 2,309,949 | Gooding | Feb. 2, 1943 |
| 2,442,531 | Eckey | June 1, 1948 |
| 2,614,937 | Baur et al. | Oct. 21, 1952 |
| 2,615,160 | Baur | Oct. 21, 1952 |
| 2,625,478 | Mattil et al. | Jan. 13, 1953 |
| 2,625,483 | Mattil et al. | Jan. 13, 1953 |
| 2,625,484 | Dominick et al. | Jan. 13, 1953 |
| 2,727,913 | Kuhrtea | Dec. 20, 1955 |
| 2,732,387 | Brokawea | Jan. 24, 1956 |